United States Patent
Kojima (10) Patent No.: US 8,810,977 B2
(45) Date of Patent: Aug. 19, 2014

(54) POWER SUPPLY SYSTEM FOR A DISPLAY PANEL

(75) Inventor: Hidekazu Kojima, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 80 days.

(21) Appl. No.: 13/534,296

(22) Filed: Jun. 27, 2012

(65) Prior Publication Data

US 2013/0003230 A1 Jan. 3, 2013

(30) Foreign Application Priority Data

Jun. 28, 2011 (EP) .................................... 11171691

(51) Int. Cl.
*H02H 3/20* (2006.01)

(52) U.S. Cl.
USPC ............................................ 361/18; 361/91.1

(58) Field of Classification Search
USPC ..................... 361/18, 56, 91.1, 111
See application file for complete search history.

(56) References Cited

U.S. PATENT DOCUMENTS 7,619,598 B2 * 11/2009 Pulvirenti et al. ............... 345/82
2009/0026977 A1 * 1/2009 Omi .............................. 315/294

* cited by examiner

*Primary Examiner* — Danny Nguyen
(74) *Attorney, Agent, or Firm* — Fish & Richardson P.C.

(57) ABSTRACT

A power supply system for a display panel includes a power supply regulator that regulates a power supply voltage of a display driver of a power supply circuit connected to the display panel, and a protection circuit that protects the display driver against an overvoltage.

12 Claims, 9 Drawing Sheets

POWER SUPPLY SYSTEM FOR A DISPLAY PANEL

CROSS-REFERENCE TO RELATED APPLICATION

This application is based upon and claims the benefit of priority from European Patent Application No. 11171691.6, filed on Jun. 28, 2011, the entire contents of which are incorporated herein by reference.

TECHNICAL FIELD

The present disclosure relates to a power supply system for a display panel and in particular to a power supply system for a display panel comprising display panel elements having organic light emitting diodes or liquid crystal display elements.

BACKGROUND

Figure 1:
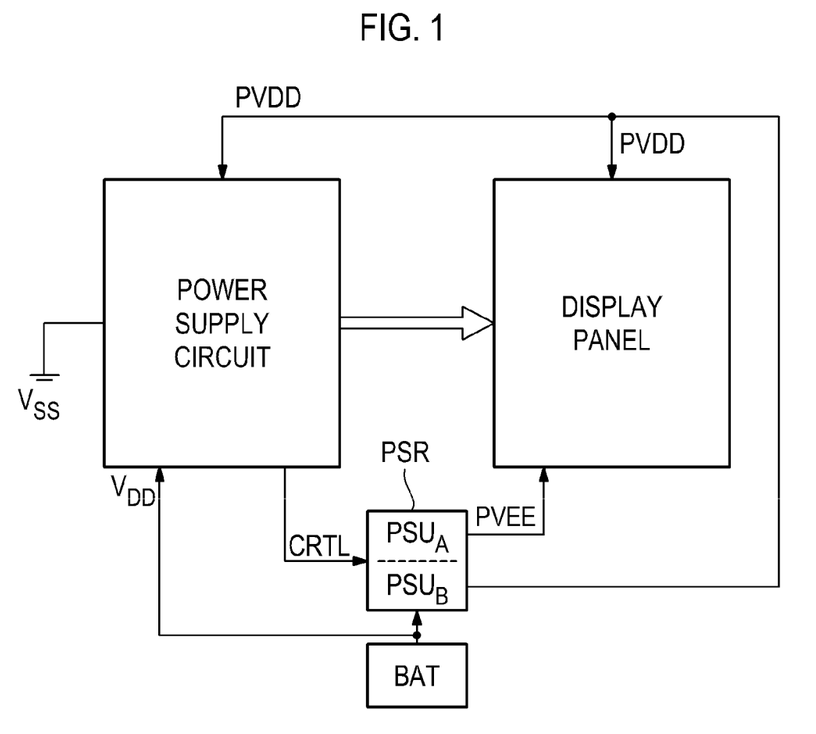
FIG. 1 shows a layout diagram of a display panel and a power supply system for supplying the display panel with a power supply voltage.

FIG. 1 shows a layout diagram of a display panel and a power supply system for supplying the display panel with a power supply voltage. The display panel as shown in FIG. 1 may include a plurality of display panel elements. These display panel elements may include liquid crystal display elements or for example organic light emitting diode (OLED) elements. An organic light emitting diode is a light emitting diode (LED) in which an emissive electroluminescent layer is formed by a film of organic compounds which can emit light in response to an electric current. This layer of organic material is located between two electrodes wherein at least one of these electrodes is transparent. A display panel having OLED elements can operate without a back light. As shown in FIG. 1, the power supply circuit supplies the display panel elements within the display panel with a power supply voltage.

Figure 2:
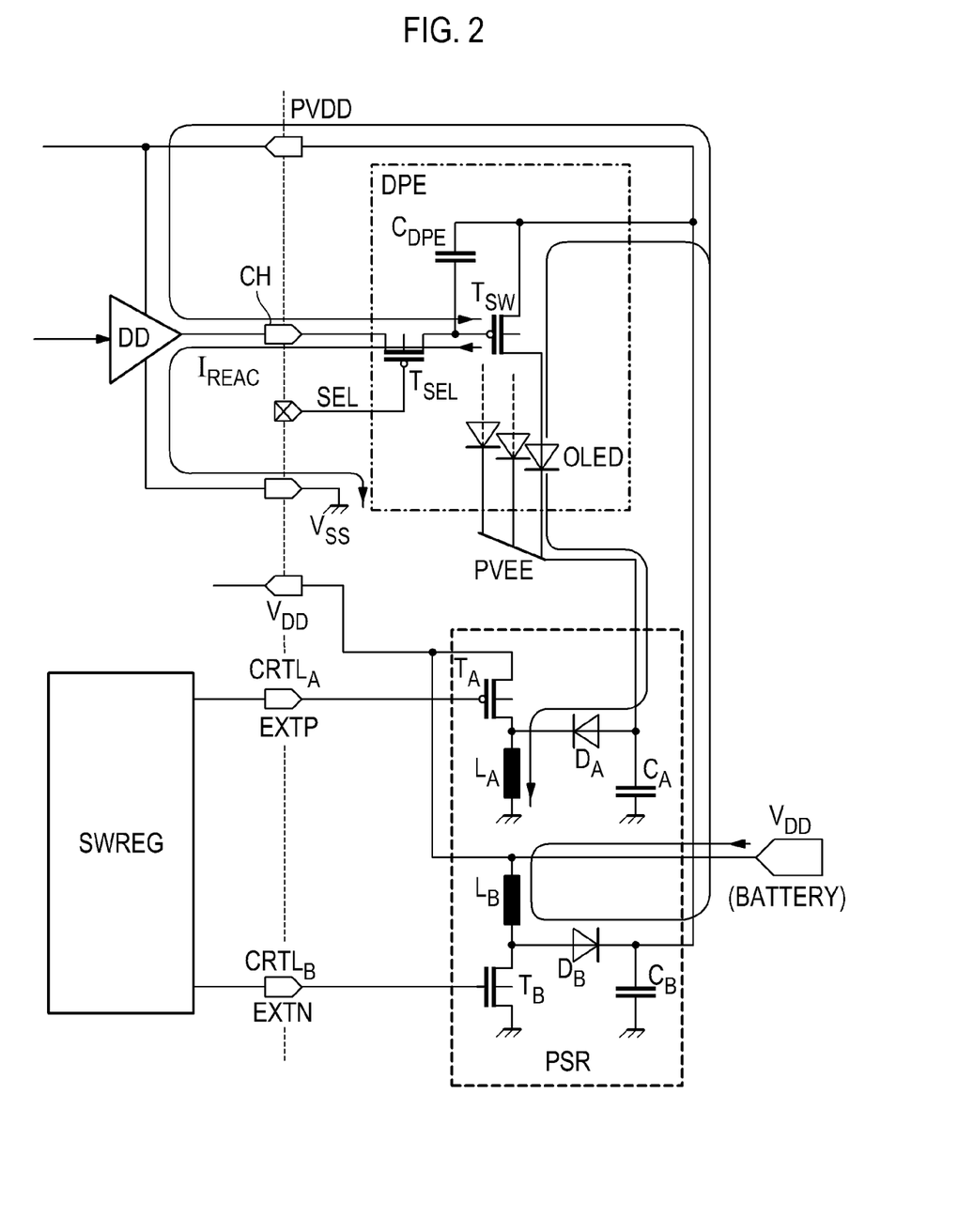
FIG. 2 shows a circuit diagram of the display panel and the power supply system shown in FIG. 1.

FIG. 2 is a circuit diagram of the display panel and the power supply system shown in FIG. 1. The display panel in FIG. 2 includes a display panel element DPE. The display panel element DPE as shown in FIG. 2 within the display panel has an organic light emitting diode OLED which is supplied with a positive power supply voltage PVDD and a negative power supply voltage PVEE wherein the positive power supply voltage PVDD may typically range from +5 Volts to +6 Volts and the negative power supply voltage PVEE may be in a range from −5 Volts to −6 Volts. The display panel element that includes an OLED is driven by a display driver DD. The display driver DD receives a voltage PVDD as the positive supply voltage of the display panel element, and a voltage $V_{SS}$ (Ground voltage which normally has a potential of zero Volts) as the negative supply voltage. The supply voltage of the display panel elements within the display panel is provided by an external power supply regulator PSR which forms an external component and is controlled by a switching control circuit SWREG which may be integrated into an integrated power supply circuit chip. The integrated switching control circuit SWREG controls the power supply regulator PSR by applying control signals to transistors of the power supply regulator PSR as shown in FIG. 2. As can be seen in FIG. 2, the power supply regulator PSR includes two symmetrical power supply units $PSU_A$, $PSU_B$ for regulating the positive power supply voltage PVDD and the negative power supply voltage PVEE of the display panel element DPE within the display panel. The negative power supply unit $PSU_A$ includes a transistor $T_A$, a coil $L_A$, a diode $D_A$ and a capacitor $C_A$. The positive power supply unit $PSU_B$ includes a transistor $T_B$, a coil $L_B$, a diode $D_B$ and a capacitor $C_B$. The transistors $T_A$ and $T_B$ of the power supply regulator PSR are controlled by switching control signals $CRTL_A$ and $CRTL_B$ output by the switching control circuit SWREG of the power supply circuit chip. The display panel element DPE as shown in FIG. 2 includes a selection transistor $T_{SEL}$ which is controlled by a selection signal CRTL-SEL to activate the display panel element. The selection transistor TSEL is switched in response to the switching control signals $CRTL_A$ and $CRTL_B$ when a driving voltage is applied to the gate of a switching transistor $T_{SW}$ of the display panel element which applies the positive power supply voltage PVDD to the organic light emitting diode OLED as shown in FIG. 2. The display panel element further includes a capacitance $C_{DPE}$ which may have a parasitic capacitance. The power supply regulator PSR regulates the positive power supply voltage PVDD and the negative power supply voltage PVEE of the display panel element DPE in response to the control signals $CRTL_A$, $CRTL_B$ received from the switching control circuit SWREG. The power supply regulator PSR is connected to a battery as shown in FIGS. 1 and 2.

SUMMARY

The arrangement as shown in FIGS. 1 and 2 has several drawbacks. The power supply regulator PSR as shown in FIG. 2 includes two power supply units PSU, i.e. a power supply unit $PSU_B$ for the positive supply voltage PVDD and a power supply unit $PSU_A$ for the negative supply voltage PVEE. Since the components of the power supply regulator PSR are not integrated and because of the high number of components the power supply regulator PSR occupies a considerable amount of space and must be wired with the display panel element DPE, the power supply circuit chip and the battery. Another severe drawback of the arrangement as shown in FIGS. 1 and 2 is that the negative power supply unit $PSU_A$ providing the negative power supply PVEE of the display panel element DPE and consisting of transistor $T_A$, coil $L_A$, diode $D_A$ and capacitor $C_A$ operates with very low efficiency. Consequently, power consumption is increased. The low efficiency of the negative power supply unit $PSU_A$ within the power supply regulator PSR is partially caused by the fact that the negative power supply unit $PSU_A$ includes a P-MOSFET $T_A$ whereas the positive power supply unit $PSU_B$ includes an N-MOSFET $T_B$.

Accordingly, there is a need for a power supply system for a display panel that overcomes the above mentioned drawbacks and in particular to provide a power supply circuit with reduced power consumption which occupies a minimal area when integrated on a chip.

In one embodiment, a power supply system for a display panel includes a power supply regulator configured to regulate a power supply voltage of a display driver connected to the display panel, and a protection circuit configured to protect the display driver against an overvoltage.

In another embodiment, the power supply regulator has a supply terminal configured to supply the power supply regulator with a received loading current.

In another embodiment, the power supply regulator includes a transistor having a control terminal connected to a switching control circuit, a first terminal connected via a coil to the supply terminal of the power supply regulator and having a second terminal to which a ground voltage is applied.

In another embodiment, the second terminal of the transistor is connected via a diode to at least one capacitor which is loaded by the loading current via the coil and the diode in response to a control signal applied to a control terminal of the transistor by the switching control circuit depending on the monitored positive power supply voltage of the display driver.

In another embodiment, the protection circuit of the power supply circuit is adapted to generate an intermediate reference voltage applied to the negative supply voltage terminal of the display driver to shift the positive power supply voltage of the display driver by a predetermined shift voltage.

In another embodiment, the protection circuit of the power supply circuit includes a voltage comparator configured to compare the positive power supply voltage of the display driver with an internal reference voltage provided by an internal reference voltage source.

In another embodiment, the protection circuit of the power supply circuit includes an impedance converter having an input connected to the voltage comparator.

In another embodiment, the protection circuit of the power supply circuit includes a transistor having a control terminal connected to the output of the impedance converter, a first terminal connected to the negative power supply terminal of the display driver and a second terminal connected to the supply terminal of the power supply regulator.

In another embodiment, a reactive current of the display panel flows under the control of the transistor of the protection circuit of the power supply circuit to the supply terminal of the power supply regulator.

In another embodiment, the reactive current flows via the coil and the diode of the power supply regulator to the at least one capacitor of the power supply regulator to reduce the power consumption when the transistor of the power supply regulator is switched off in response to the control signal applied to the control terminal of the transistor by the switching control circuit.

In another embodiment, the supply terminal of the power supply regulator is connected to the second terminal of the transistor of the protection circuit and is connected to a battery.

In another embodiment, the transistor of the power supply regulator is formed by a MOSFET.

The transistor of the power supply regulator in some embodiments is formed by an N-MOSFET. In another embodiment, the transistor of the protection circuit is also formed by a MOSFET.

In some embodiments, this MOSFET is also formed by an N-MOSFET.

The disclosure further provides a display panel including display panel elements connected to a power supply system. The power supply system includes a power supply regulator configured to regulate a power supply voltage of a display driver of the power supply system connected to the display panel and includes a protection circuit configured to protect the display driver against an overvoltage.

BRIEF DESCRIPTION OF THE DRAWINGS

Embodiments of the power supply system for a display panel are described with reference to the enclosed drawings.

DETAILED DESCRIPTION

Figure 3:
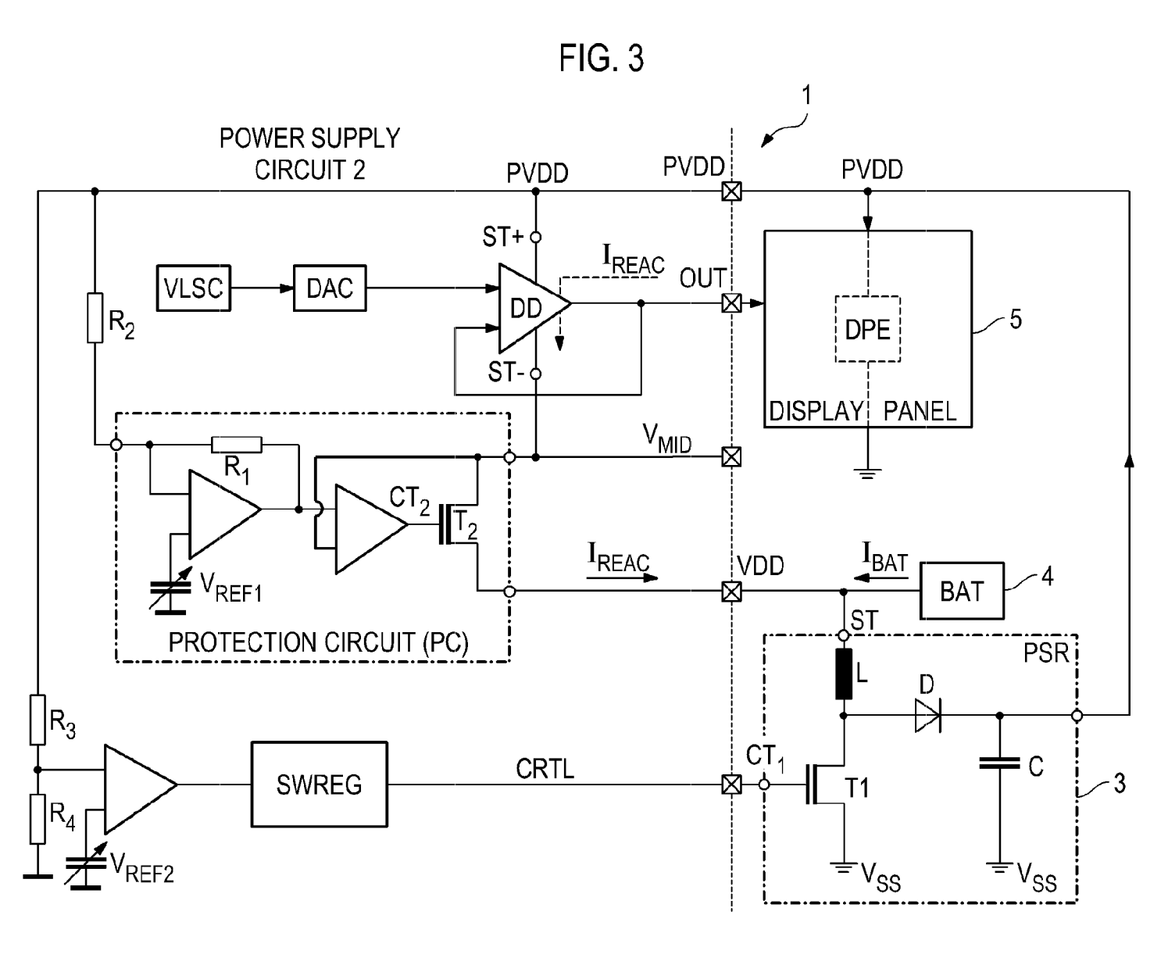
FIG. 3 shows an embodiment of a power supply system for supplying a display panel with a power supply voltage.
Figure 7:
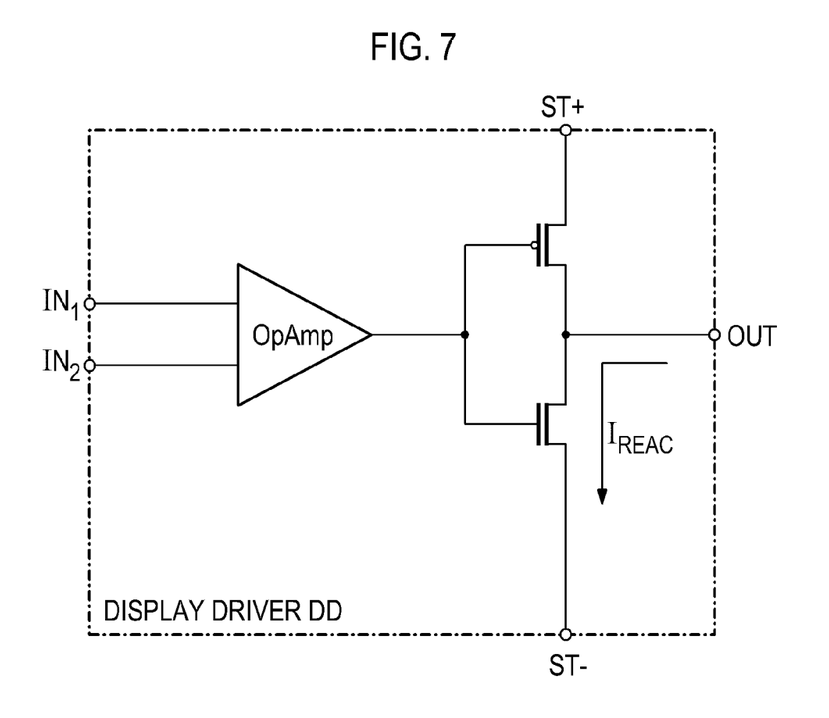
FIG. 7 shows a circuit diagram of a possible implementation of a display driver as employed by a power supply circuit within a power supply system according to the present disclosure.

FIG. 3 is an illustration of a power supply system 1 that includes a power supply circuit 2 and a power supply regulator 3. The power supply circuit 2 may be an integrated power supply circuit chip. The power supply regulator 3, as illustrated in this embodiment, is an external component connected to the power supply circuit 2 and to a battery 4. The power supply system 1 includes the power supply circuit 2. The power supply regulator 3 is provided for supplying a display panel 5 having a plurality of display panel elements DPE with a power supply voltage. The display panel elements DPE of the display panel 5 may each include in a possible implementation at least one organic light emitting diode OLED. In an alternative embodiment, the display panel elements DPE of the display panel 5 may also include at least one liquid crystal display LCD element. The driving voltage for the display panel element DPE is applied to the display panel 5 via an output terminal (Out) of the power supply circuit 2 and a display driver DD within the power supply circuit 2. The display driver DD has an output for supplying a driving signal to the display panel element DPE wherein the signal or driving voltage is generated in response to an analogue signal applied to the display driver DD, for example by a digital analogue converter DAC which converts a digital input signal to an analogue signal being applied to the display driver DD. The digital input signal is applied to the digital analogue converter DAC, e.g. by a voltage level shift circuit VLSC shifting a voltage amplitude of a digital input signal which may be applied to the voltage level shift circuit VLSC for example by a digital control circuit. The display driver DD has a positive supply terminal ST+ and a negative supply terminal ST−. The positive power supply voltage PVDD is applied to the positive supply terminal ST+ of the display driver DD. A possible implementation of the display driver DD is shown in FIG. 7. This positive supply voltage PVDD for the display driver DD is a regulated voltage supplied to the power supply circuit 2 by the external power supply regulator 3 as shown in FIG. 3. The power supply regulator 3 is adapted to regulate a power supply voltage PVDD for the display panel 5 and for the power supply circuit 2.

As can be seen in FIG. 3 the power supply circuit 2 of the power supply system 1 includes a protection circuit PC which is adapted to protect the display driver DD of the power supply circuit 2 against an overvoltage. The protection circuit PC generates an intermediate internal reference voltage $V_{MID}$ which is applied to the negative supply voltage terminal ST− of the display driver DD. This intermediate reference voltage $V_{MID}$ is further supplied as the negative supply voltage of the display panel 5 as can be seen in FIG. 3.

In one embodiment, the protection circuit PC includes a voltage comparator for comparing the positive power supply voltage PVDD applied to the positive supply terminal ST+ of the display driver DD with an internal reference voltage $V_{REF1}$ provided by an internal reference voltage source. The comparator may be formed by an operational amplifier and a feedback resistor R1 as shown in FIG. 3. The input of the operational amplifier is connected to the positive power supply voltage PVDD via a resistor R2 and the other input is connected to the internal reference voltage source VREF1. The internal reference voltage source may be formed in one embodiment by a bandgap circuit. In a possible implementation, the reference voltage may be selected or adapted in a range between 0.5 Volts to 1.0 Volts. The protection circuit PC further includes an impedance converter which may also be formed by an operational amplifier having an input connected to the voltage comparator. In the embodiment shown in FIG. 3, the protection circuit PC includes a transistor T2 having a control terminal CT2 connected to the output of the impedance converter. In the implementation of FIG. 3, the MOSFET T2 is formed by an N-MOSFET. The MOSFET T2 includes a first terminal connected to the negative power supply terminal ST− of the display driver DD and a second terminal connected to a VDD terminal of the power supply circuit 2. The protection circuit PC generates an internal reference voltage $V_{MID}$ by shifting the regulated positive power supply voltage PVDD by a predetermined shift voltage $\Delta V$. For a display panel 5 that includes OLED display panel elements DPE, the shift voltage $\Delta V$ may be for example 6 Volts. In this embodiment, the positive power supply voltage PVDD applied to the positive supply terminal ST+ of the display driver DD may be for example +12 Volts and the protection circuit PC adjusts the intermediate reference voltage $V_{MID}$ to a voltage which is lower than the positive supply voltage PVDD by a predetermined shift voltage $\Delta V$ of for example 6 Volts. Accordingly, in this embodiment, the internal intermediate reference voltage $V_{MID}$ is 12 Volts−6 Volts=6 Volts. The negative supply voltage applied to the negative supply terminal ST− of the display driver DD follows the positive supply voltage PVDD and is not static as in the conventional circuit shown in FIG. 2. In this way, the display driver DD is effectively protected by the protection circuit PC against an overvoltage between the positive supply terminal ST+ and the negative supply terminal ST−. This in turn allows for the use of low voltage transistors within the display driver DD where each of the low voltage transistors has a lower admissible terminal-to-terminal voltage drop, i.e. transistors which are less resilient against overvoltage. These transistors do occupy less chip area when integrated on the power supply circuit 2. In a possible embodiment, the display driver DD includes transistors having an admissible terminal-to-terminal voltage drop of less than 7 Volts. These transistors can be classified as medium-voltage transistors occupying a reduced chip area when integrated in the power supply circuit 2.

The reactive current $I_{REAC}$ coming from the display panel element DPE of the display panel 5 flows under the control of the transistor T2 of the protection circuit PC to the terminal VDD and from there to a supply terminal ST of the power supply regulator 3. The reactive current (IVDD) which flows at terminal VDD is given by:

$$IVDD=(PVDD-VDD)/VDD*I_{REAC}$$

For example if the terminal is connected to VDD=3V and the positive supply voltage PVDD=12V and the reactive current $I_{REAC}$=5 mA then the current at the terminal VDD is:

$$IVDD=(12-3)/3*5mA=15mA$$

This current is reused to reduce the total current consumption.

The reactive current $I_{REAC}$ flows then through the coil L and the diode D to the capacitor C of the power supply regulator 3 as long as the transistor T1 of the power supply regulator 3 is switched off. Consequently, with the power supply system 1 according to the present disclosure as shown in the embodiment of FIG. 3, the reactive current $I_{REAC}$ of the display panel element DPE is not wasted but used to load the capacitor C of the power supply regulator 3. Consequently, some battery current $I_{BAT}$ provided for loading the capacitor C of the power supply regulator 3 can be saved thus reducing the battery charge consumption and increasing the battery life of the battery 4. The transistor T1 of the power supply regulator 3 is formed by an N-MOSFET receiving a control signal CRTL from a switching control circuit SWREG integrated in the power supply circuit 2. The loading current flows via the coil L and the diode D of the power supply regulator 3 to the at least one capacitor C of the power supply regulator 3 to reduce the power consumption if the transistor T1 of the power supply regulator 3 is switched off in response to the control signal CRTL applied to the control terminal CT1 of the transistor T1 by the switching control circuit SWREG. The coil L of the power supply regulator 3 can store energy in a magnetic field during a current flow when transistor T1 is on, i.e. switched through in response to the control signal CRTL. This stored energy can be released and provided to store the electrical charge in the capacitor C if the transistor T1 is switched off. The switching control circuit SWREG controls the control terminal CT1 of the transistor T1 within the power supply regulator 3 depending on the monitored positive power supply voltage PVDD of the power supply driver. The monitoring is achieved by a comparator comparing the positive power supply voltage PVDD of the display driver DD and a second reference voltage $V_{REF2}$ as shown in FIG. 3. The comparator may include operational amplifier resistors R3, R4 as well as a second reference voltage source which may be formed by a bandgap circuit.

As can be seen in FIG. 3, the power supply system 1 illustrated only includes one positive power supply unit within the regulator 3 regulating the positive power supply voltage PVDD of the display panel 5 of the power supply circuit 2. The power supply system 1 in some embodiments does not include a negative power supply regulator regulating a negative power supply voltage for a display panel. Since the efficiency of a positive power supply regulator 3 as shown in FIG. 3 is relatively high, the total power consumption is reduced. Further, the power supply regulator 3 has a lower technical complexity than the conventional power supply regulator shown for example in FIG. 2. The power supply regulator 3 includes fewer components than the conventional power supply regulator and occupies less space when integrated in an apparatus having the display panel 5. Further, it is easier to connect or wire the power supply regulator 3 to other components since it has less connection terminals than the conventional power supply regulator shown in FIG. 2.

Accordingly, the power supply system 1 has significant advantages over the conventional power supply system as shown for example in FIG. 1. The power supply system 1 according to one embodiment includes a power supply circuit 2 with a floating intermediate reference voltage $V_{MID}$ which follows the positive power supply voltage PVDD of the display driver DD, and thus protects the display driver DD efficiently against overvoltage and allows the display driver DD to be implemented with medium-voltage transistors occupying less area when integrated on a chip. Further, the reactive current $I_{REAC}$ of the display panel element DPE is used to supply the power supply regulator 3 to save battery current and thus reduce power consumption and increase battery life. The power supply regulator 3 used by the power supply system 1 according to some embodiments has high efficiency and thus reduces power consumption further. Moreover, the external power regulator 3 has low technical complexity and includes a low number of components and connection terminals saving space in an apparatus and facilitates easier wiring of the power supply regulator 3 when connecting it to the power supply circuit 2 and the display panel 5.

The power supply system 1 may be used for supplying different kinds of display panels with a power supply voltage. The display panel 5 may be a display panel that includes OLED display panel elements. Further, the display panel 5 may also be a display panel having LCD display panel elements.

Different possible embodiments and variations of the power supply system 1 as shown in FIG. 3 are possible. For example, in a possible implementation, the capacitance of the capacitor C in the power supply regulator 3 may be adjustable. Further, the switching components may be formed by other components than the N-MOSFETS shown in FIG. 3. In a possible embodiment, a buffer capacitor may also be connected to the supply terminal ST of the power supply regulator 3. The buffer capacitor may be connected between the supply terminal ST and the ground voltage $V_{SS}$.

Figure 4:
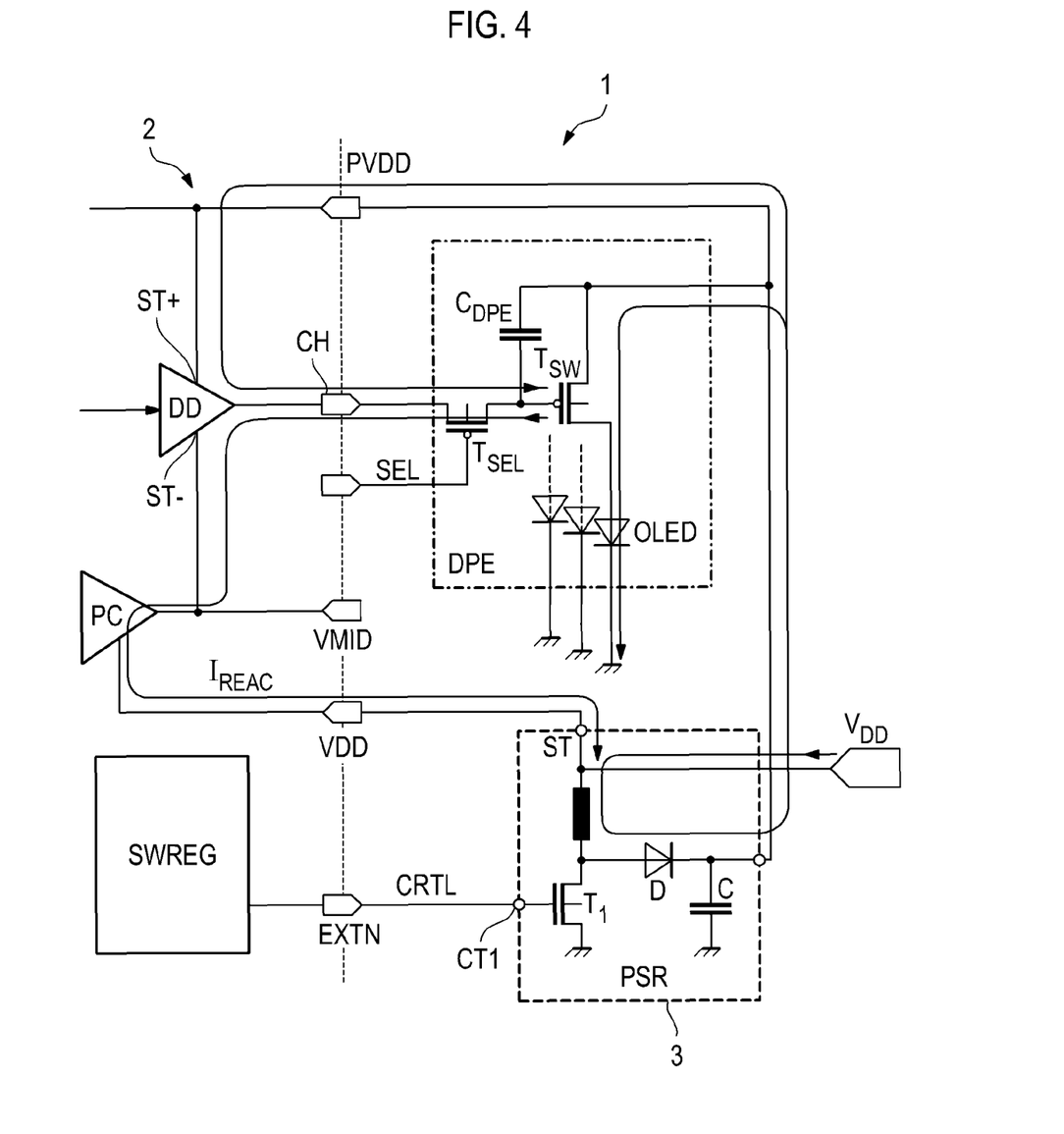
FIG. 4 shows another embodiment of a power supply system for supplying a display panel with a power supply voltage.

FIG. 4 illustrates another embodiment of the power supply system 1. FIG. 4 is similar to the circuit diagram of FIG. 3 and shows the display panel element DPE within the display panel in more detail. The display panel element DPE includes a selection transistor $T_{SEL}$ as well as a switching transistor $T_{SW}$. The selection transistor $T_{SEL}$ is controlled by a selection control signal SEL to select the display panel element DPE. When the selection transistor $T_{SEL}$ is switched through in response to the selection control signal SEL, the control gate of the switching transistor $T_{SW}$ is connected to the output of the display driver DD as shown in FIG. 4. When the switching transistor $T_{SW}$ is switched through by the driving signal, the regulated power supply voltage PVDD is applied to the organic light emitting diodes OLED of the display panel element DPE. The protection circuit PC of the power supply circuit 2 generates an intermediate reference voltage $V_{MID}$ which forms a negative supply voltage $V_{SS}$ of the organic light emitting diodes OLED of the display panel element DPE, as shown in FIG. 4. The protection circuit PC generates the internal reference voltage $V_{MID}$ by shifting the regulated positive power supply voltage PVDD by a predetermined shift voltage $\Delta V$. For a display panel 5 that includes display panel elements DPE as shown in FIG. 4, the shift voltage $\Delta V$ may be for example 6 Volts. FIG. 4 illustrates the current flow into the display panel element DPE and from the display panel element DPE. As can be seen from FIG. 4, the reactive current $I_{REAC}$ flows from the capacitance $C_{DPE}$ of the display panel element DPE to the display driver DD and from there to the protection circuit PC and to the supply terminal ST of the power supply regulator 3.

Figure 5A:
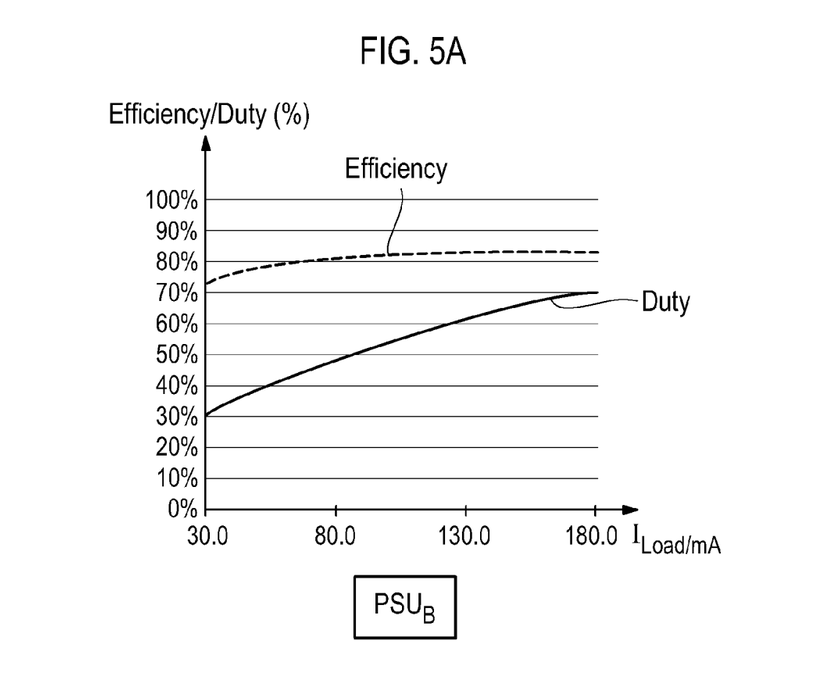
FIGS. 5A and 5B show diagrams for illustrating the power efficiency of a positive and negative power supply unit.
Figure 5B:
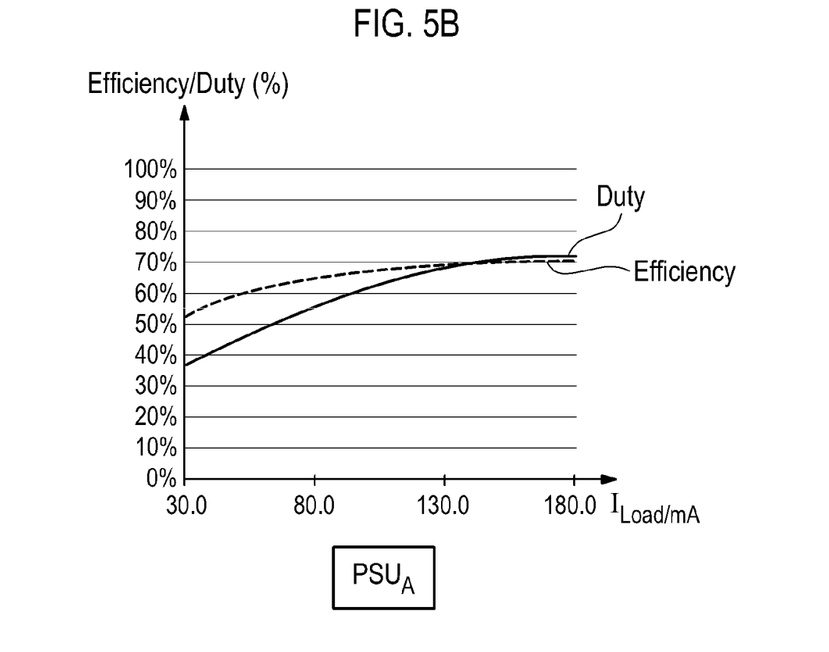

FIGS. 5A and 5B show diagrams for illustrating the efficiency of a negative power supply unit $PSU_A$ and a positive power supply unit $PSU_B$. A power supply regulator PSR as shown in FIG. 2 includes a power supply unit $PSU_B$ for the positive supply voltage PVDD and a negative power supply unit $PSU_A$ for the negative supply voltage. As can be seen from FIG. 2, the positive power supply unit $PSU_B$ includes an N-MOSFET $T_B$ whereas the negative power supply unit $PSU_A$ includes a P-MOSFET $T_A$. FIGS. 5A and 5B illustrate the efficiency of the respective power supply unit PSU depending on the loading currents $I_{LOAD}$. It can be seen from FIGS. 5A and 5B that the efficiency increases with increasing loading currents $I_{LOAD}$, however, the efficiency of the negative power supply unit $PSU_A$ for providing the negative supply voltage is significantly lower than the efficiency of the positive power supply unit $PSU_B$ for providing the positive power supply voltage PVDD. The power supply system 1 of the present disclosure includes as a power supply regulator 3 with a positive power supply unit $PSU_B$ having a N-MOSFET T1 as shown in FIG. 3. Consequently, the power supply regulator 3 of the power supply system 1 according to some embodiments operates with a high efficiency and the total power consumption is reduced. In the measurements of FIGS. 5A and 5B, the positive power supply unit $PSU_B$ with an N-MOSFET has a high efficiency because a parasitic gate capacitance of such an N-MOSFET is lower than the parasitic gate capacitance of a P-MOSFET as used in a negative power supply unit $PSU_A$. For a loading current $I_{LOAD}$=100 mA the efficiency of the positive power supply unit $PSU_B$ is about 82% in the shown example whereas the efficiency of the negative power supply unit $PSU_A$ is only 67%. In an embodiment of the power supply system 1, a power supply regulator 3 that includes at least one positive power supply unit $P_{SUB}$ exhibits the operation behaviour as illustrated in FIG. 5A.

Figure 6:
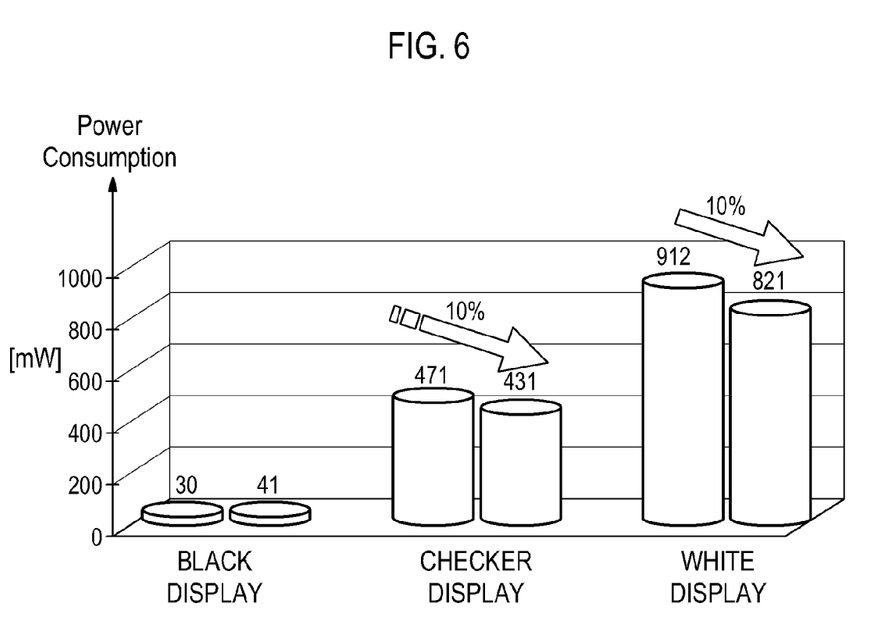
FIG. 6 shows a diagram for comparing the power consumption of a conventional power supply system in comparison with a power supply system according to the present disclosure for different display operations.

FIG. 6 shows a diagram for illustrating the power consumption of a conventional power supply system and the power consumption of a power supply system according to some embodiments of the present disclosure. The diagram of FIG. 6 shows the power consumption in mW for different operations of the display panel 5 supplied with power by the power supply system.

In the first diagram of FIG. 6, a display panel 5 powered by the power supply system is black and consumes only a little amount of power as can be seen in FIG. 6. The left column shows the power consumption of a conventional power supply system and the right column shows the power consumption of the power supply system 1 according to an embodiment of the present disclosure for a black display. It can be seen that for a black display the power consumption of the power supply system 1 according to an embodiment of the present disclosure is slightly higher than the power consumption of a conventional power supply system.

In the centre of FIG. 6, the power consumption of a power supply system for a chequered display is illustrated, i.e., a display where the display panel elements are alternating between black and white. The left column shows again the power consumption of a conventional power supply system whereas the right column shows the power consumption of a power supply system 1 for a chequered display in one embodiment of the present disclosure. It can be seen from the diagram of FIG. 6 that a power supply system 1 according to one embodiment of the present disclosure consumes about 10% less power than a conventional power supply system for a chequered display panel 5.

As can be seen in FIG. 6, a white display panel 5 consumes the most power. The left column shows the power consumption of a conventional power supply system whereas the right column shows the power consumption of a power supply system 1 according to an embodiment of the present disclosure for a white display. The power consumption reduction when employing the power supply system 1 according to an embodiment of the present disclosure is about 10%. This causes a significant absolute power consumption reduction of about 200 mW for a white display panel 5.

FIG. 7 shows a circuit diagram of a possible implementation of a display driver DD as employed within a power supply circuit 2 according to the present disclosure as shown in the embodiments of FIGS. 3 and 4. It can be seen from FIG.

7 that the display driver DD includes an operation amplifier and a complementary output stage connected to the positive supply terminal ST+ and the negative supply terminal ST− of the display driver DD.

The output of the display driver DD may be looped back to the input terminal IN2 of the operation amplifier as illustrated in FIG. 3. The other input IN1 of the display driver DD may be connected to the output of a digital analogue converter DAC as shown in FIG. 3. The output stage includes a P-MOSFET and an N-MOSFET as shown in FIG. 7. The reactive current $I_{REAC}$ may flow from an output terminal OUT of the display driver DD via the N-MOSFET to the negative supply terminal ST− as shown in FIG. 7. From the negative supply terminal ST− the reactive current $I_{REAC}$ can flow to the protection circuit PC and to the power supply regulator 3 also illustrated in FIG. 4.

Figure 8:
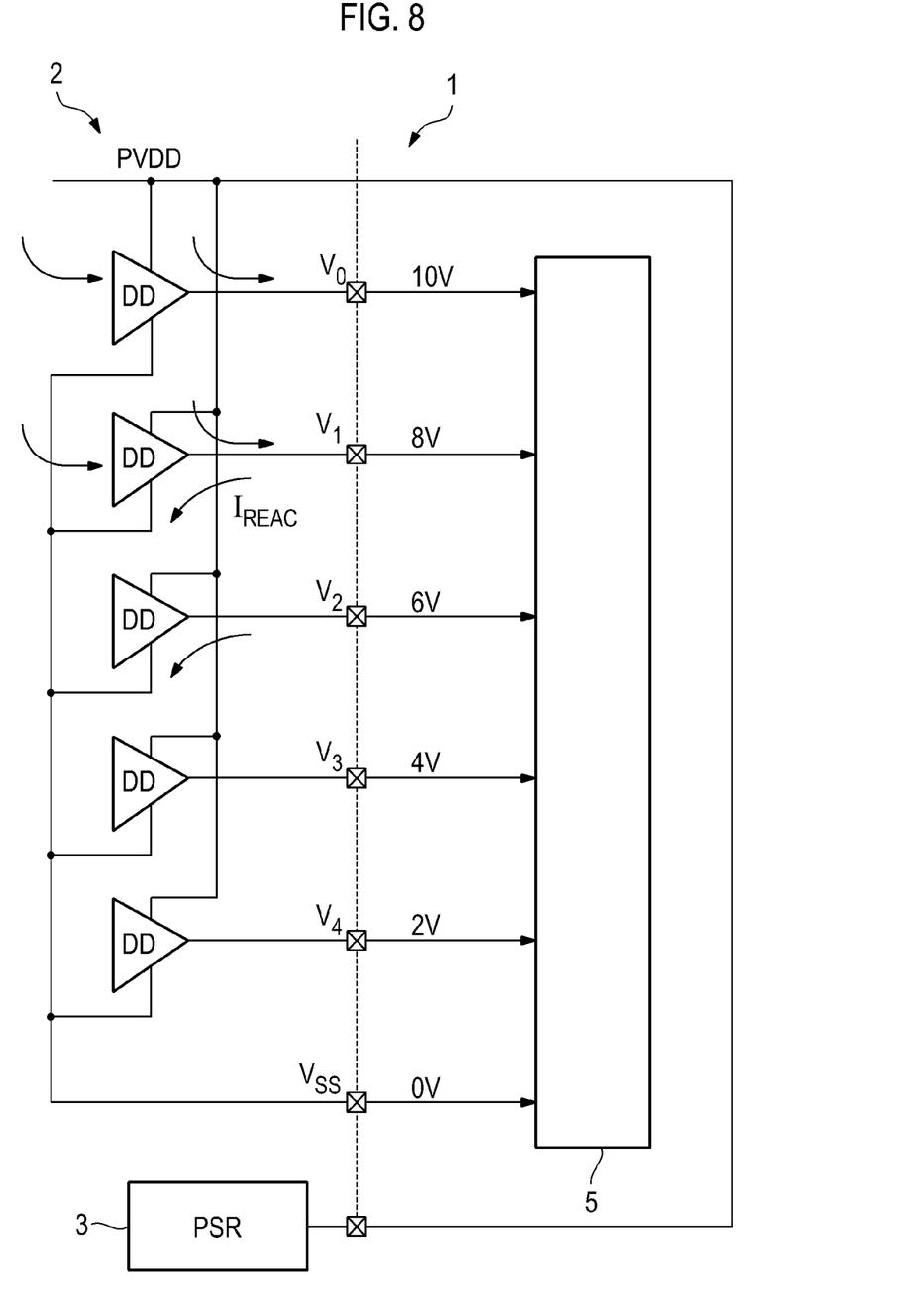
FIG. 8 shows a possible embodiment of a power supply circuit within a power supply system according to the present disclosure for driving an LCD display panel.

FIG. 8 shows a possible embodiment of a power supply system 1 according to an embodiment of the present disclosure for supplying a display panel 5 which may be an LCD-panel. The power supply circuit 2 includes in the shown embodiment several display drivers DD providing different power supply potentials from V0, V1, V2, V3, V4, VSS for the display panel 5. In the shown example of FIG. 8, the power supply circuit 2 provides different power supply potentials of V0=10 V, V1=8 V, V2=6 V, V3=4 V, V4=2 V, VSS=0 V. The positive supply terminal ST+ of each display driver DD is connected to the positive power supply voltage PVDD provided by the power supply regulator 3. The negative supply terminal ST− of each display driver DD is connected to the negative supply voltage VSS. The supply voltage VSS may be ground GND. The display drivers DD of the power supply circuit 2 as shown in FIG. 8 provide different power supply potential levels as illustrated in FIG. 8 for the LCD panel 5.

Figure 9:
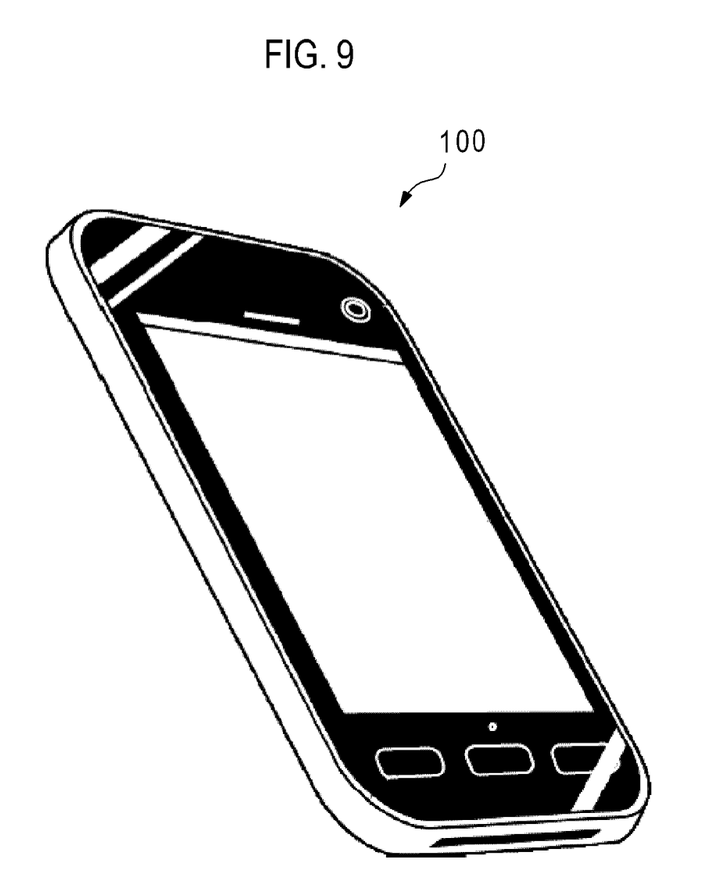
FIG. 9 is an illustration of a smartphone in which a power supply system according to the present disclosure is installed.

FIG. 9 is an illustration of a smartphone 100 to which the power supply system 1 according to the present disclosure may be applied.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A power supply system for a display panel, the power supply system comprising:
a power supply regulator configured to regulate a power supply voltage of a display driver of a power supply circuit connected to the display panel; and
a protection circuit configured to protect the display driver against an overvoltage,
wherein the power supply regulator has a supply terminal configured to supply the power supply regulator with a received loading current,
wherein the power supply regulator comprises a transistor having a control terminal connected to a switching control circuit of the power supply circuit, a first terminal connected via a coil to the supply terminal of the power supply regulator and a second terminal to which a ground voltage is applied, and
wherein the second terminal of the transistor is connected via a diode to at least one capacitor which is loaded by the loading current via the coil and the diode in response to a control signal applied to a control terminal of the transistor by the switching control circuit depending on the monitored positive power supply voltage of the display driver.

2. The power supply system according to claim 1,
wherein the protection circuit of the power supply circuit is adapted to generate an intermediate reference voltage applied to the negative supply voltage terminal of the display driver to shift the positive power supply voltage of the display driver by a predetermined shift voltage.

3. The power supply system according to claim 2,
wherein the protection circuit of the power supply circuit comprises a voltage comparator configured to compare the positive power supply voltage of the display driver with an internal reference voltage provided by an internal reference voltage source.

4. The power supply system according to claim 3,
wherein the protection circuit of the power supply circuit comprises an impedance converter having an input connected to the voltage comparator.

5. The power supply system according to claim 4,
wherein the protection circuit of the power supply circuit comprises a transistor having a control terminal connected to the output of the impedance converter, a first terminal connected to the negative power supply terminal of the display driver and a second terminal connected to the supply terminal of the power supply regulator.

6. The power supply system according to claim 5,
wherein a reactive current of the display panel flows under the control of the transistor of the protection circuit of the power supply circuit to the supply terminal of the power supply regulator.

7. The power supply system according to claim 6,
wherein the reactive current flows via the coil and the diode of the power supply regulator to the at least one capacitor of the power supply regulator to reduce the power consumption when the transistor of the power supply regulator is switched off in response to the control signal applied to the control terminal of the transistor by the switching control circuit.

8. The power supply system according to claim 5,
wherein the supply terminal of the power supply regulator is connected to the second terminal of the transistor of the protection circuit and is connected to a battery.

9. The power supply system according to claim 5,
wherein the transistor of the power supply regulator and the transistor of the protection circuit of the power supply circuit are formed by MOSFETs.

10. A display panel comprising display panel elements connected to a power supply system according to claim 1.

11. The display panel according to claim 10,
wherein each of the display panel elements comprises at least one organic light emitting diode.

12. The display panel according to claim 10,
wherein each of the display panel elements comprises at least one liquid crystal display element.

* * * * *